Wyckoff & Morrison,
Boring Wood.

Nº 13,606. Patented Sep. 25, 1855.

UNITED STATES PATENT OFFICE.

A. WYCKOFF AND E. R. MORRISON, OF ELMIRA, NEW YORK.

BORING-MACHINE.

Specification of Letters Patent No. 13,606, dated September 25, 1855.

*To all whom it may concern:*

Be it known that we, A. WYCKOFF and E. R. MORRISON, of Elmira, in the county of Chemung and State of New York, have invented a new and Improved Boring-Machine, Intended Chiefly for Boring Pump-Logs; and we do hereby declare that the following is a full, clear, and exact description of the same, reference being had to the annexed drawings, making a part of this specification, in which—

Figure 2:
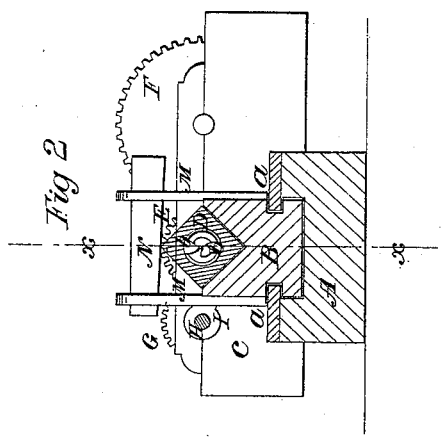
Figure 1:
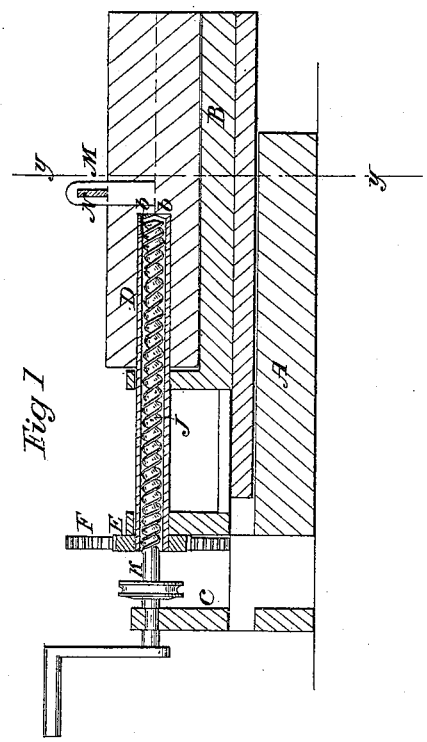
Figure 3:
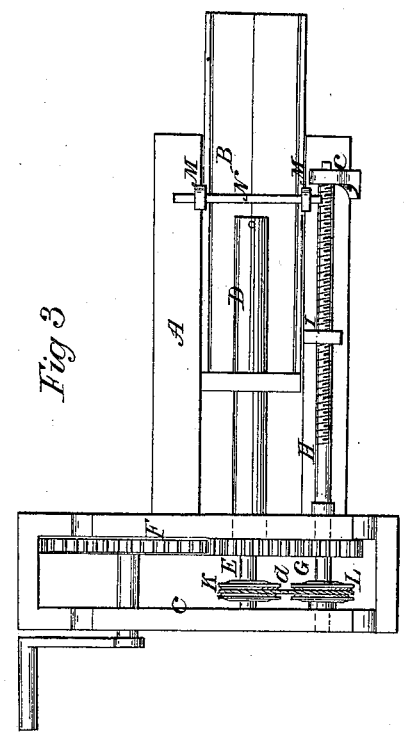

Figure 1, is a longitudinal vertical section of our improvement, $(x)$ $(x)$, Fig. 2, showing the plane of section. Fig. 2, is a transverse vertical section of ditto, $(y)$ $(y)$, Fig. 1, showing the plane of section. Fig. 3, is a plan or top view of ditto.

Similar letters of reference indicate corresponding parts in the several figures.

The nature of our invention consists 1st in the employment or use of a tubular or hollow auger, constructed and arranged as will be presently shown, and also in the combination of the tubular or hollow auger with a screw or worm rod arranged and operating as will be hereafter described.

To enable others skilled in the art to make and use our invention, we will proceed to describe its construction and operation.

A, represents a bed piece in which a carriage B, is fitted and slides longitudinally, the carriage working between suitable guides $(a)$, $(a)$, as shown in Fig. 2. To the end of the bed piece A, a transverse box C, is attached.

D, represents an auger, which is hollow or of tubular form. The back end of the auger has its bearing in the inner side of the box C, and the outer end of the auger passes through the inner side of the carriage B, which side forms the other bearing. The bits or cutting portion $(b)$, of the auger, are attached to its outer end, and are placed over the "bore" of the auger, the points of the bits just passing the center of the "bore" so as to cut a clean hole without leaving a core. The cutting edge of each bit is slightly rounded longitudinally as shown in Fig. 2. To the inner or back end of the auger D, there is attached a pinion E, into which a toothed wheel F, gears, the wheel F, being hung in the box C. The pinion E, on the auger D, gears into a pinion G, on one end of a screw rod H, the inner bearing of which is in the inner side of the box C, and the bearing $(c)$, at the outer end of the screw rod is attached to the bed piece A.

I, represents a nut through which the screw rod H, passes, said nut being attached to one side of the carriage B.

Within the hollow or tubular auger D, there is placed a screw or worm rod J, see Fig. 1. This screw or worm rod resembles the screw portion of an ordinary screw auger, and extends the whole length of the auger D, its outer end nearly touching the bits $(b)$, of the auger. The inner end or shank of the screw or worm rod J, has its bearing in the outer side of the box C, and a pulley K, is placed upon the shank of the screw or worm rod, a band $(d)$, passing around said pulley, and also around a pulley L, on the back end of the screw rod H.

To each side of the carriage B, an upright M, is attached, through the upper parts slots are cut, one in each, in which slots a taper key N, is fitted.

Operation: The log to be bored, shown in red, is placed in the carriage B, and is firmly secured therein by the key N, the carriage being drawn out from the bed piece A, so that the end of the log will be in contact with the outer end of the auger D. Motion is then given the toothed wheel F, in any proper manner, and the auger D, will rotate, and also the screw or worm rod J, the auger turning in a reverse direction to the screw or worm rod; as the bits $(b)$, cut the wood or log, the chips pass within the auger, and the worm or screw rod passes the chips out at the back end of the auger. The log is fed to the auger as fast as the auger will cut, by means of the screw rod H, and nut I, motion being communicated to the screw rod by the band $(d)$, which passes around the pulleys K, L.

By the above improvement logs may be bored directly through their center, from end to end. The machine requires but little attendance, and works rapidly, the auger cannot follow the grain of the wood, and consequently will not be deflected from its direct course.

Having thus described our invention, what we claim as new and desire to secure by Letters Patent, is—

1. The employment or use of the tubular or hollow auger D, constructed as shown for the purpose specified.

2. We also claim the combination of the tubular or hollow auger D, and worm or screw J, arranged substantially as shown for the purpose specified.

A. WYCKOFF.
E. R. MORRISON.

Witnesses for A. Wyckoff:
   JAS. GEO. MASON,
   WM. TUSCH.
Witnesses for E. R. Morrison:
   HENRY W. ELLIOTT,
   PERRY S. MORRISON.